US007551619B2

(12) United States Patent
Tiwari (10) Patent No.: US 7,551,619 B2
(45) Date of Patent: Jun. 23, 2009

(54) IDENTITY-BASED NETWORKING

(75) Inventor: Manish Tiwari, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 378 days.

(21) Appl. No.: 11/400,165

(22) Filed: Apr. 5, 2006

(65) Prior Publication Data

US 2007/0086398 A1   Apr. 19, 2007

Related U.S. Application Data

(60) Provisional application No. 60/728,096, filed on Oct. 18, 2005, provisional application No. 60/727,025, filed on Oct. 13, 2005.

(51) Int. Cl.
*H04L 12/28* (2006.01)
*H04L 12/56* (2006.01)
(52) U.S. Cl. .................................................. 370/392
(58) Field of Classification Search ................. 370/235,
370/338, 328, 395, 392, 463, 331, 409, 229,
370/230, 389, 401, 393, 358; 709/249, 218–223,
709/245, 246, 226, 232, 230, 228; 455/446,
455/422; 713/150, 182; 726/11; 398/79
See application file for complete search history.

(56) References Cited

U.S. PATENT DOCUMENTS

| 3,641,433 A | 2/1972 | Mifflin et al. |
| 4,168,400 A | 9/1979 | de Couasnon et al. |
| 4,176,316 A | 11/1979 | DeRoas et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |

(Continued)

FOREIGN PATENT DOCUMENTS

WO   WO94/03986   2/1994

(Continued)

OTHER PUBLICATIONS

U.S. Appl. No. 11/487,722, filed Jul. 2006, Simons et al.

(Continued)

*Primary Examiner*—Wing F Chan
*Assistant Examiner*—Prenell P Jones
(74) *Attorney, Agent, or Firm*—Perkins Coie LLP (57) ABSTRACT

A technique for identity based networking is disclosed. A system according to the technique can include a WAN, a first VLAN, a second VLAN, and a network database. The first VLAN and second VLAN can be coupled to the WAN. The network database can include VLAN information. In operation, a client that is authorized on the second VLAN can attempt to connect to the first VLAN. A switch in the WAN can perform a lookup in the network database and determine that the client is authorized on the second VLAN. Based on this information, the client can be connected to the second VLAN using VLAN tunneling.

17 Claims, 10 Drawing Sheets

U.S. PATENT DOCUMENTS

| | | |
|---|---|---|
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | McRae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten et al. |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,078,568 A | 6/2000 | Wright |
| 6,088,591 A | 7/2000 | Trompower |
| 6,119,009 A | 9/2000 | Baranger et al. |
| 6,160,804 A | 12/2000 | Ahmed et al. |
| 6,188,694 B1 | 2/2001 | Fine et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,285,662 B1 | 9/2001 | Watannabe |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ulfongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 | 7/2003 | Ata-Laurila et al. |
| 6,614,787 B1 * | 9/2003 | Jain et al. .................. 370/390 |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,687,498 B2 | 2/2004 | McKenna et al. |
| 6,725,260 B1 | 4/2004 | Philyaw |
| 6,747,961 B1 | 6/2004 | Ahmed et al. |
| 6,839,338 B1 | 1/2005 | Amara et al. |
| 6,879,812 B2 | 4/2005 | Agrawal et al. |
| 6,973,622 B1 | 12/2005 | Rappaport et al. |
| 6,978,301 B2 | 12/2005 | Tindal |
| 7,020,773 B1 | 3/2006 | Otway et al. |
| 7,110,756 B2 | 9/2006 | Diener |
| 7,376,080 B1 * | 5/2008 | Riddle et al. ................ 370/229 |
| 2002/0052205 A1 | 5/2002 | Belostofsky et al. |
| 2002/0080752 A1 | 6/2002 | Forslow |
| 2002/0095486 A1 | 7/2002 | Bahl |
| 2002/0101868 A1 * | 8/2002 | Clear et al. .................. 370/389 |
| 2002/0191572 A1 | 12/2002 | Weinstein et al. |
| 2003/0014646 A1 | 1/2003 | Buddhikot et al. |
| 2003/0018889 A1 | 1/2003 | Burnett et al. |
| 2003/0107590 A1 | 6/2003 | Levillain et al. |
| 2003/0174706 A1 | 9/2003 | Shankar et al. |
| 2004/0025044 A1 | 2/2004 | Day |
| 2004/0047320 A1 | 3/2004 | Eglin |
| 2004/0062267 A1 * | 4/2004 | Minami et al. .............. 370/463 |
| 2004/0064560 A1 | 4/2004 | Zhang et al. |
| 2004/0095914 A1 | 5/2004 | Katsube et al. |
| 2004/0095932 A1 | 5/2004 | Astarabadi et al. |
| 2004/0143428 A1 | 7/2004 | Rappaport et al. |
| 2004/0208570 A1 * | 10/2004 | Reader ........................ 398/79 |
| 2004/0230370 A1 | 11/2004 | Tzamaloukas |
| 2004/0259555 A1 | 12/2004 | Rappaport et al. |
| 2005/0030929 A1 | 2/2005 | Swier et al. |
| 2005/0058132 A1 * | 3/2005 | Okano et al. ................ 370/389 |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0128989 A1 | 6/2005 | Bhagwat et al. |
| 2005/0157730 A1 * | 7/2005 | Grant et al. ................ 370/401 |
| 2005/0180358 A1 | 8/2005 | Kolar et al. |
| 2005/0181805 A1 | 8/2005 | Gallagher |

| | | |
|---|---|---|
| 2005/0193103 A1 | 9/2005 | Drabik |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0259597 A1 | 11/2005 | Benedetto et al. |
| 2005/0273442 A1 | 12/2005 | Bennett |
| 2005/0276218 A1 | 12/2005 | Ooghe et al. |
| 2006/0045050 A1 | 3/2006 | Floros et al. |
| 2006/0174336 A1* | 8/2006 | Chen .......................... 726/11 |
| 2006/0200862 A1 | 9/2006 | Olson et al. |
| 2006/0245393 A1 | 11/2006 | Bajic |
| 2006/0276192 A1 | 12/2006 | Dutta et al. |

FOREIGN PATENT DOCUMENTS

| | | |
|---|---|---|
| WO | WO99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

U.S. Appl. No. 11/592,891, filed Nov. 2006, Murphy.
U.S. Appl. No. 11/595,119, filed Nov. 2006, Murphy.
U.S. Appl. No. 11/604,075, filed Nov. 2006, Murphy et al.
U.S. Appl. No. 11/643,329, filed Dec. 2006, Towari.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast.
U.S. Appl. No. 11/852,234, filed Sep. 2007, Gast et al.
U.S. Appl. No. 11/944,346, filed Nov. 2007, Gast.
U.S. Appl. No. 11/966,912, filed Dec. 2007, Chesnutt et al.
U.S. Appl. No. 11/970,484, filed Jan. 2008, Gast.
U.S. Appl. No. 11/975,134, filed Oct. 2007, Aragon et al.
U.S. Appl. No. 12/077,051, filed Mar. 2008, Gast.
Puttini, R., Percher, J., Me, L., and de Sousa, R. 2004. A fully distributed IDS for MANET. In *Proceedings of the Ninth international Symposium on Computers and Communications* 2004 vol. 2 (*Iscc"04*)—vol. 02 (Jun. 28-Jul. 1, 2004). ISCC. IEEE Computer Society, Washington, DC, 331-338.
U.S. Appl. No. 11/326,966, filed Jan. 5, 2006, Taylor.
U.S. Appl. No. 11/330,877, filed Jan. 11, 2006, Matta.
U.S. Appl. No. 11/331,789, filed Jan. 14, 2006, Matta et al.
U.S. Appl. No. 11/351,104, filed Feb. 8, 2006, Tiwari.
U.S. Appl. No. 11/377,859, filed Mar. 15, 2006, Harkins.
U.S. Appl. No. 11/445,750, filed May 3, 2006, Matta.
U.S. Appl. No. 11/417,830, filed May 30, 2006, Morain.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19, 2006, Zeldin.
U.S. Appl. No. 11/437,387, filed May 19, 2006, Zeldin et al.
U.S. Appl. No. 11/437,582, filed May 19, 2006, Bugwadia et al.
U.S. Appl. No. 11/451,704, filed Jun. 12, 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.

* cited by examiner

IDENTITY-BASED NETWORKING

CROSS-REFERENCE TO RELATED APPLICATIONS

This Application claims the benefit of U.S. Provisional Application No. 60/727,025 filed on Oct. 13, 2005, and U.S. Provisional Application No. 60/728,096 filed on Oct. 18, 2005 which are incorporated by reference.

BACKGROUND

A wide area network (WAN) is a computer network covering a large geographical area. Typically, a WAN is used to connect local area networks (LANs) together. A WAN can involve a vast array of network devices, network resources, and the like. The most well-known WAN is the Internet.

Organizations often have a separate LAN for every regional office. Each LAN is connected to each other thereby forming the organization's WAN. When a user travels from one office to another, the user can access his/her network resources over the WAN, such as email, calendar and task list. However, the user will not have the same IP address, access to local network resources, firewall settings, etc., because the user is accessing the LAN remotely.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for identity based networking involves virtual LAN (VLAN) tunneling between mobility domains. An example of a system according to the technique includes a WAN, a first VLAN, a second VLAN, and a network database. The first VLAN, the second VLAN and the network database are coupled to the WAN. The network database includes VLAN information. In operation, a client that is authorized on the second VLAN attempts to connect to the first VLAN. A switch in the WAN performs a lookup in the network database and determines that the client is authorized on the second VLAN. Based on this information, the client is connected to the second VLAN using VLAN tunneling.

In alternate embodiments, the switch can be a network domain member and the system can further include a network domain seed. The network domain seed can be coupled to the network domain member and the network database can be stored on the network domain seed. In order to perform a lookup in the network database, the network domain member can query the network domain seed for information.

In another embodiment, the system can further include a second network domain seed and a second network domain member. The second network domain seed can be coupled to the first network domain seed and the second network domain member. The first network domain member can tunnel to the second network domain seed to connect the client to the second VLAN. In another example, the network database can be stored on the second network domain seed and can include IP addresses for switches on the WAN, VLAN names, and VLAN tunnel affinities.

In another embodiment, the system can further include a third network domain member that supports the second VLAN. The second network domain member can have a first tunnel affinity and the third network domain member can have a second tunnel affinity. The client can tunnel to the network domain member with the highest tunnel affinity. In other embodiments, the network domain seeds and the network domain members can be in geographically distinct locations.

In another embodiment, the system can further include a first access point, a second access point, and a third access point. Each of the access points can be coupled to the switch. The access points can be used to triangulate the position of the client in order to pinpoint the client's exact location.

An example of a method according to the technique involves receiving a log-in request from a client. The log-in request is received on a first VLAN. VLAN information associated with the client configuration on a second VLAN is provided. Using the VLAN information, the client is determined to be configured on the second VLAN. The client is then connected to the second VLAN using VLAN tunneling.

In additional embodiments, the method can involve a first network domain member and a second network domain member. The log-in request can be received by the first network domain member. The first network domain member can tunnel to the second network domain member in order to connect the client to the second VLAN. The method can also involve a network domain seed and a network database. The network domain seed can be queried for the VLAN information and a lookup can be performed in the network database.

In another embodiment, information can be retrieved from a plurality of network domain seeds that are coupled to the WAN. The VLAN information can include tunnel affinity information of two network domain members. The tunnel affinities can be compared and the client connected to the network domain member with the highest tunnel affinity.

Advantageously, the technique can be used to connect a remote client to an appropriate VLAN over WAN links. This technique allows a remote user to have the same experience as if connected locally. For example, the client can have the same IP address, network permissions and access to network resources while being in a geographically distinct location. These and other advantages of the present invention will become apparent to those skilled in the art upon a reading of the following descriptions and a study of the several figures of the drawings.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
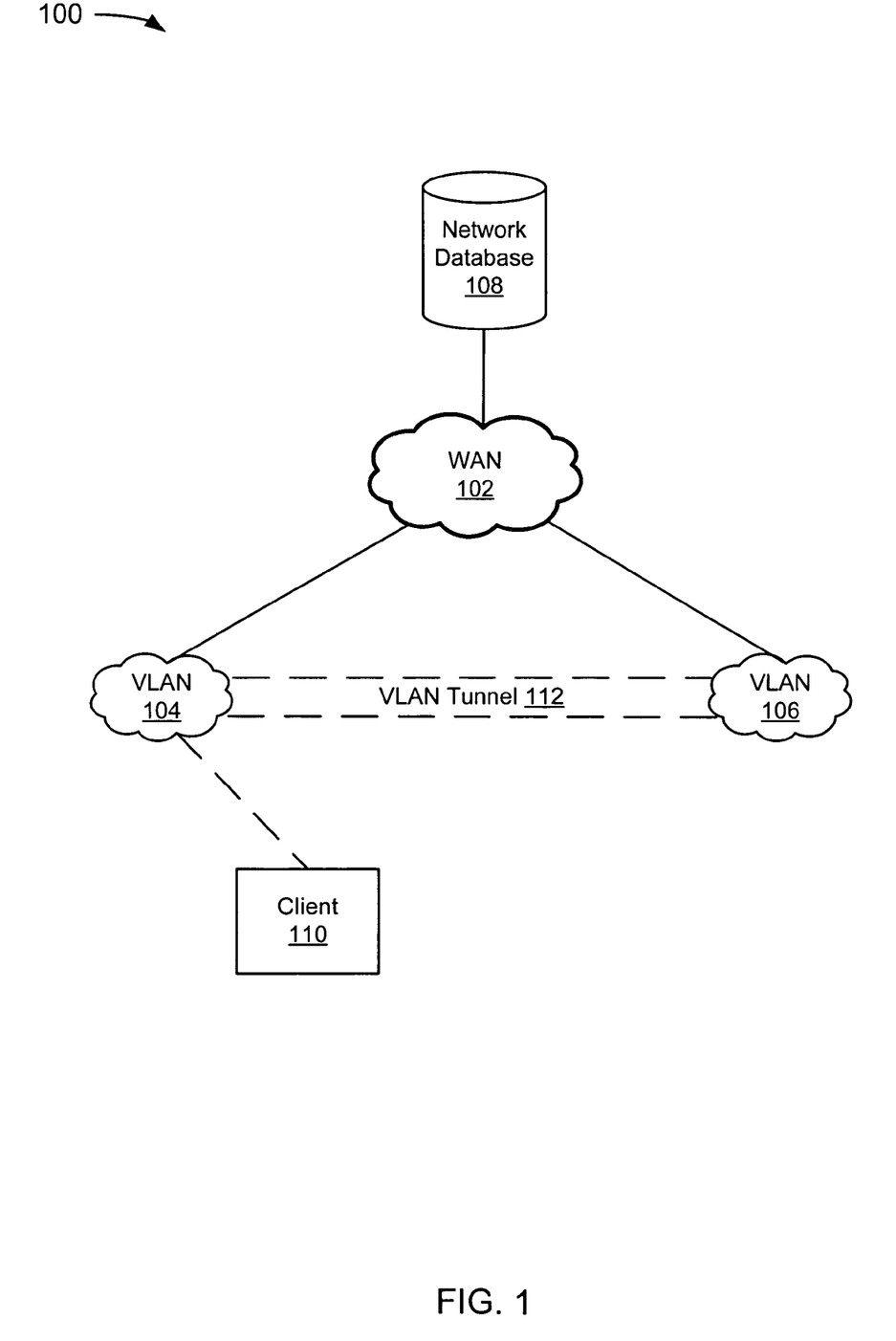
FIG. 1 depicts an example of a system for identity based networking.

FIG. 1 depicts an example of a system 100 for identity based networking. In the example of FIG. 1, the system 100 includes a WAN 102, a first VLAN 104, a second VLAN 106, and a network database 108. In the example of FIG. 1, the WAN 102 is coupled to the first VLAN 104 and the second VLAN 106. The network database 108 is also coupled to the WAN 102.

In an embodiment, the network database 108 can contain a variety of information, including, but not limited to, VLAN information, tunnel affinity information, an IP address for switches and/or clients on the WAN and/or VLAN, a mac address for switches and/or clients on the WAN and/or VLAN, log-in information, network permissions, etc. In another embodiment, the network database can be a forwarding database, such as is described in co-pending U.S. patent application Ser. No. 11/351,104 by Manish Tiwari entitled "System and Method for Network Integrity," filed Feb. 8, 2006, which is incorporated herein by reference. The network database 108 can be populated by relaying network information from switches over the WAN 102 and storing the network information in the network database 108. In another embodiment, the network database 108 can be duplicatively stored on any number of switches in the network. Additionally, the network database 108 can be distributed and shared among the switches in the network rather than stored in a central location.

In the example of FIG. 1, in operation, a client 110 attempts to connect to the first VLAN 104. The attempt can be facilitated in any convenient and/or know manner, manual or automatic, including, but not limited to, logging into the network, connecting to the network via a wired or wireless connection, being detected by network components, attempting to use network resources, etc. A switch (not shown) on the network performs a lookup in the network database 108. The network database 108 contains information that the client is authorized on the second VLAN 106. Based on this information, the client 110 is connected to the second VLAN 106 via VLAN tunneling 112.

VLAN tunneling 112 can be accomplished using any convenient and/or known technique. By way of example but not limitation, tunneling can be executed on the application layer, transport layer, network layer and/or data link layer in a data network system. Tunneling can be achieved using a variety of protocols (depending on the network layer utilized), such as, by way of example and not limitation, the DNS, TLS/SSL, TFTP, FTP, HTTP, IMAP, IRC, NNTP, POP3, SIP, SMTP, SNMP, SSH, TELNET, BitTorrent, RTP, rlogin, ENRP, TCP, UDP, DCCP, SCTP, IL, RUDP, IPv4, IPv6, ICMP, IGMP, ARP, RARP, Wi-Fi, Token ring, PPP, SLIP, FDDI, ATM, Frame Relay, and/or SMDS protocol. In other embodiments, additional layers and protocols can be used that facilitate VLAN tunneling.

Figure 2:
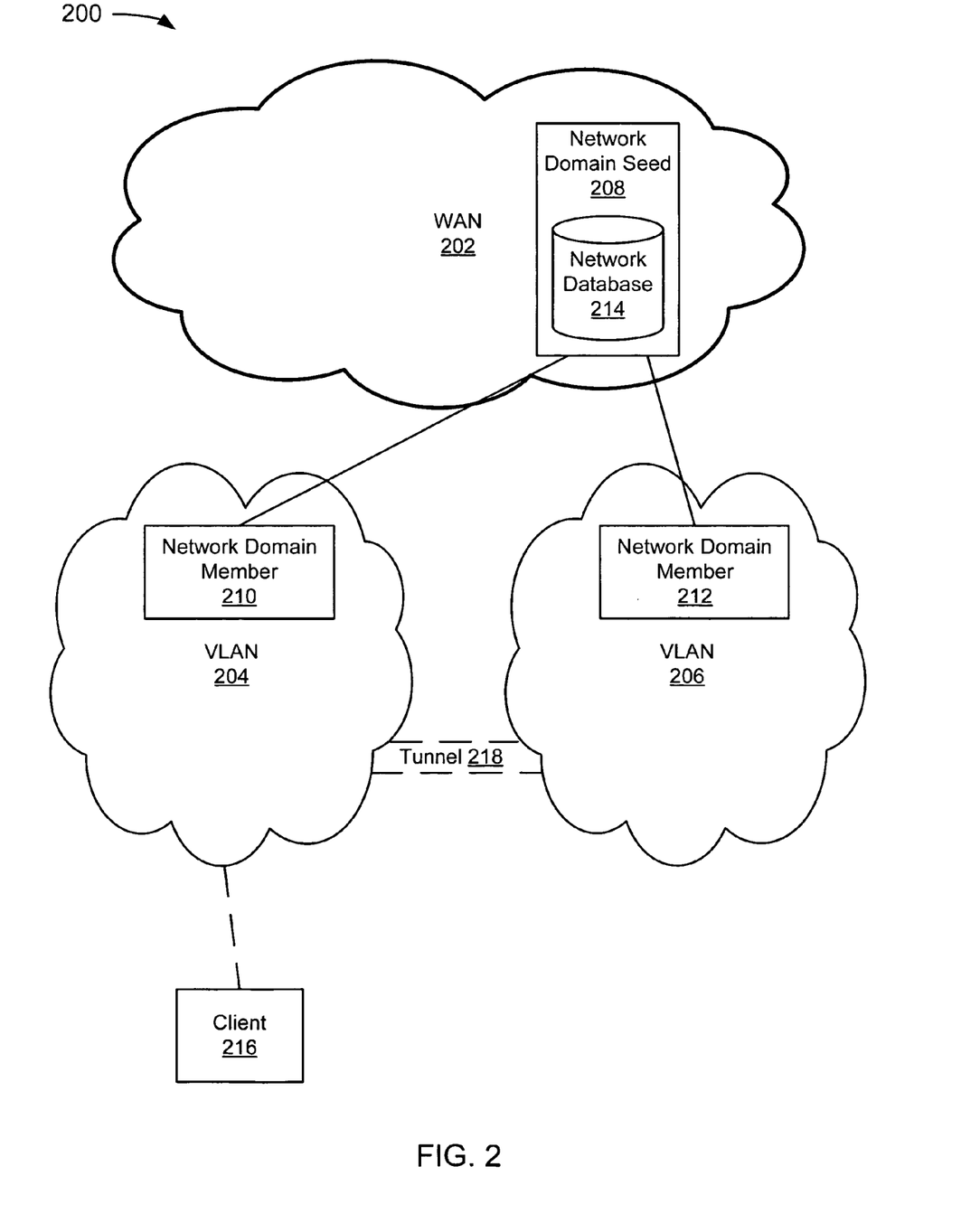
FIG. 2 depicts an alternative example of a system for identity based networking.

FIG. 2 depicts an alternative example of a system 200 for identity based networking. In the example of FIG. 2, the system 200 includes a WAN 202, a VLAN 204 and a VLAN 206. In the example of FIG. 2, the WAN 202 includes a network domain seed 208. The VLAN 204 includes a network domain member 210 and the VLAN 206 includes a network domain 212.

In the example of FIG. 2, the WAN 202 is connected to the VLAN 204 and the VLAN 206. The connection is facilitated by the network domain seed 208 which is coupled to the network domain member 210 and the network domain member 212. A network database 214 is located on the network domain seed 208. In alternate embodiments, the network database 214 can be located in any convenient and/or known location, including, but not limited to, the network domain member 210 and/or the network domain member 212.

In the example of FIG. 2, in operation, a client 216 attempts to connect to the VLAN 204. The client 216 attempts this connection by logging on to the network through the network domain member 210. In an embodiment, the client 216 can be a wired or wireless client and the network domain member 210 can be a switch that provides wired or wireless access. In another embodiment, the network domain member 210 can be a switch as described in co-pending U.S. patent application Ser. No. 11/351,104 by Manish Tiwari entitled "System and Method for Network Integrity," filed Feb. 8, 2006.

In the example of FIG. 2, in operation, after the client 216 attempts to log-on to the network, the network domain member 210 queries the network domain seed 208 for VLAN information. The network domain seed 208 performs a lookup in the network database 214. The network database 214 provides that the client 216 is authorized on the VLAN 206. The network domain seed 208 relays the information to the network domain member 210. Based on the information, the network domain member 210 creates a tunnel 218 to the network domain member 212 facilitating the connection of the client 216 to the VLAN 206.

Figure 3:
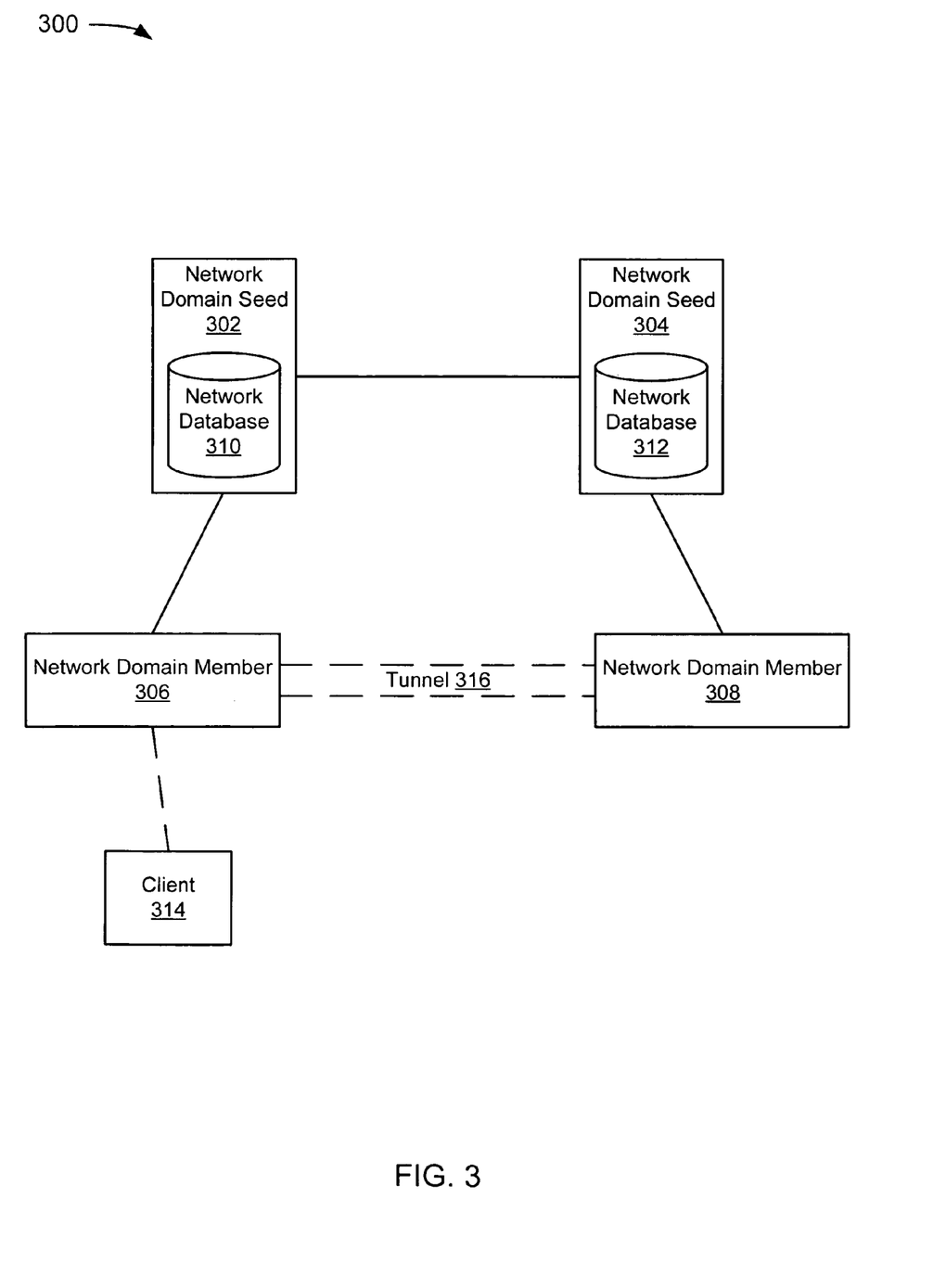
FIG. 3 depicts an alternative example of a system for identity based networking.

FIG. 3 depicts an alternative example of a system 300 for identity based networking. In the example of FIG. 3, the system 300 includes a network domain seed 302, a network domain seed 304, a network domain member 306, a network domain member 308, a network database 310, and a network database 312. The network domain seed 302 is coupled to the network domain seed 304 and the network domain member 306. The network domain seed 304 is additionally coupled to the network domain member 308. In the example of FIG. 3, the network database 310 is stored on the network domain seed 302 and the network database 304 is stored on the network domain seed 312. In an embodiment, the network database 310 and the network database 312 store the same information. In other embodiments, the information stored in the network databases 310, 312 can be different.

In the example of FIG. 3, in operation, a client 314, who may be authorized on a second VLAN, attempts to connect to the network domain member 306 which supports a first VLAN. The network domain member 306 queries the network domain seed 302 for VLAN information. The network domain seed 310 performs a lookup in the network database 310. The network database 310 is populated with information received from the network domain seed 312. In another embodiment, the network database 310 could be populated with information received from theoretically any number of network domain seeds. In an embodiment, the information can be used to identify the VLAN(s) each network domain member supports. In an alternative embodiment, one or both of the network databases can be removed and the network domain seed 302 can query the network domain seed 304 to determine which VLAN the network domain member 308 supports.

In the example of FIG. 3, in operation, after performing a lookup in the network database 310, the network domain seed 302 relays VLAN information to the network domain member 306. The VLAN information provides, for example, that the client 314 is authorized on the second VLAN. The VLAN information may also provide that the second VLAN is supported by the network domain member 308. Based on the VLAN information, the network domain member 306 tunnels to the network domain member 308. Advantageously, the client 314 is connected to the second VLAN via a VLAN tunnel 316.

Figure 4:
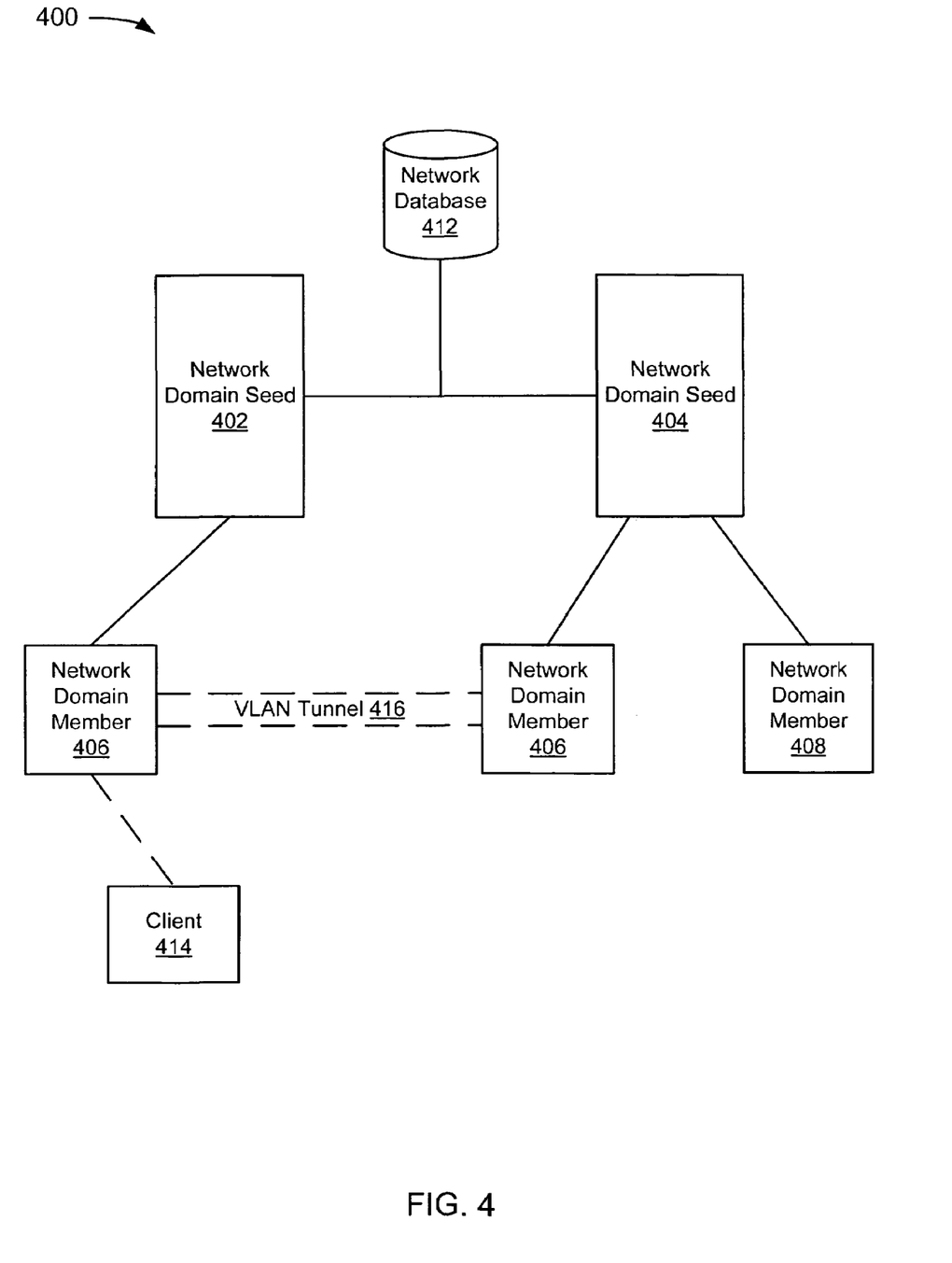
FIG. 4 depicts an alternative example of a system for identity based networking.

FIG. 4 depicts an alternative example of a system 400 for identity based networks. In the example of FIG. 4, the system 400 includes a network domain seed 402, a network domain seed 404, a network domain member 406, a network domain member 408, a network domain member 410, and a network database 412. As shown, the network domain seed 402 is coupled to the network domain seed 404. The network domain member 406 is coupled to the network domain seed 402. The network domain member 408 and the network domain member 410 are coupled to the network domain seed 404. The network database 412 is coupled to and accessible by the network domain seed 402 and the network domain seed 404. In the example of FIG. 4, the network domain member 406 supports a first VLAN while the network domain member 408 and the network domain member 410 support a second VLAN.

In the example of FIG. 4, in operation, a client 414 attempts to connect to the network domain member 406. The network domain member 406 queries the network domain seed 402 for VLAN information. The network domain seed 402 retrieves VLAN information from the network database 412. The VLAN information provides, for example, that the client 414 is authorized on the second VLAN. The VLAN information may also provide that the network domain member 408 and/ or the network domain member 410 support the second VLAN. In addition, the VLAN information may provide that the tunnel affinity for the network domain member 408 is higher than the tunnel affinity for the network domain member 410. Based on this information, the network domain member 406 creates a VLAN tunnel 416 to the network domain member 408 and the client 414 is connected to the second VLAN.

Figure 5:
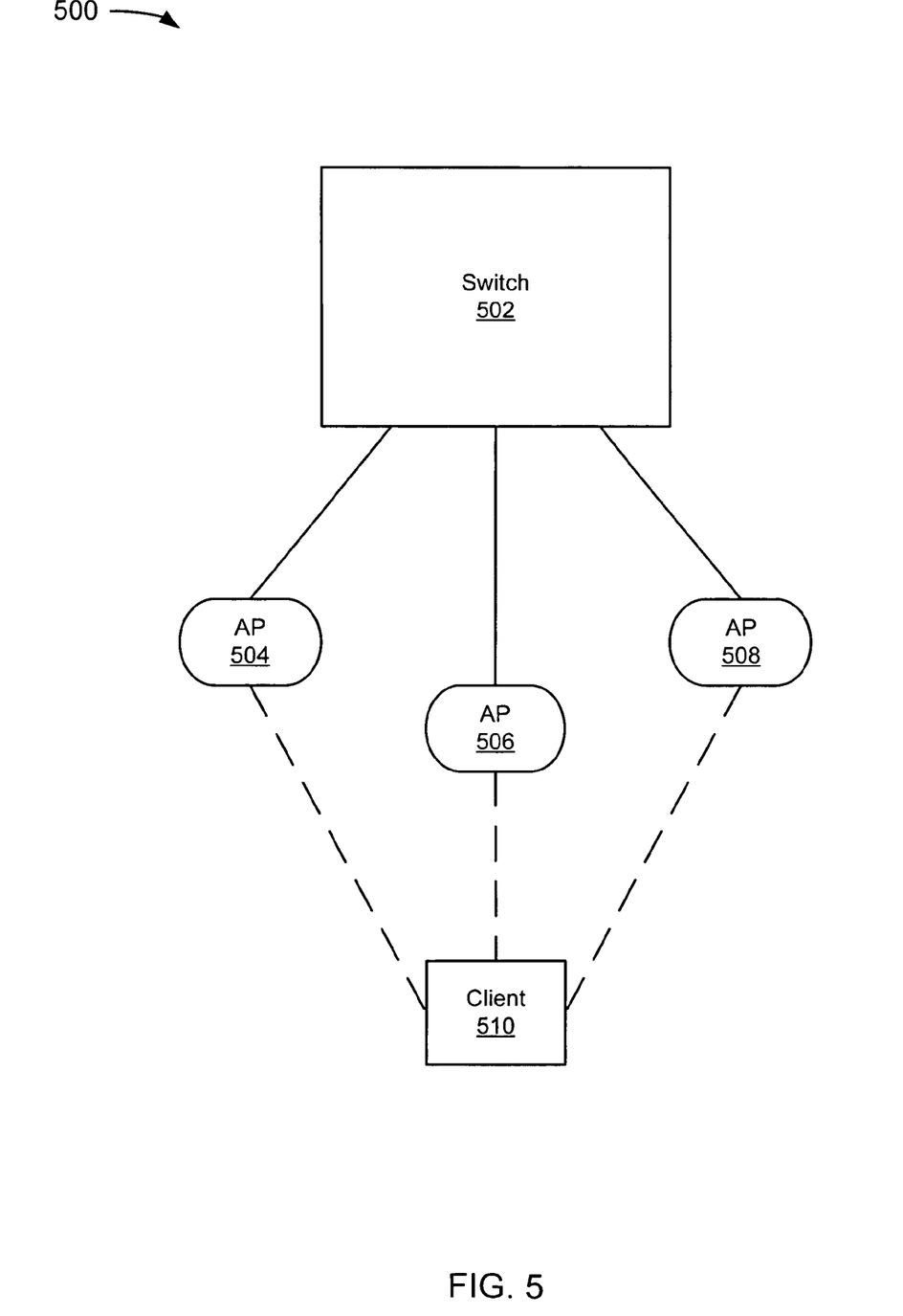
FIG. 5 depicts an example of a location system.

FIG. 5 depicts a location system 500. In the example of FIG. 5, the system 500 includes a switch 502, an access point 504, an access point 506, and an access point 508. The access point 504, the access point 506 and the access point 508 are coupled to the switch 502. The switch 502 can be network domain member and/or a network domain seed. The access points can provide wired and/or wireless access to a network. Further, the switch and access points can be as describe in co-pending U.S. patent application Ser. No. 11/351,104 by Manish Tiwari entitled "System and Method for Network Integrity," filed Feb. 8, 2006.

In the example of FIG. 5, in operation, a client 510 is detected by the system 500. Specifically, in the example of FIG. 5, the access point 504, the access point 506 and the access point 508 detect the client 510. The client 510 can detected by any known and/or convenient technique, including, by way of example but not limitation, sniffing for transmitted packets, monitoring access of network resources, providing network connectivity, etc. Once the client 510 is detected by the access points 504, 506, 508, the precise location of the client 510 can be calculated using any convenient and/or known technique, including, by way of example but not limitation, triangulation techniques in one or more dimensions. In other embodiments, additional access points can be coupled to the switch 502 or access points can be taken away. If additional access points are coupled to the switch 502, the location of the client may become more precise while if access points are taken away, the location of the client may become less defined.

Figure 6:
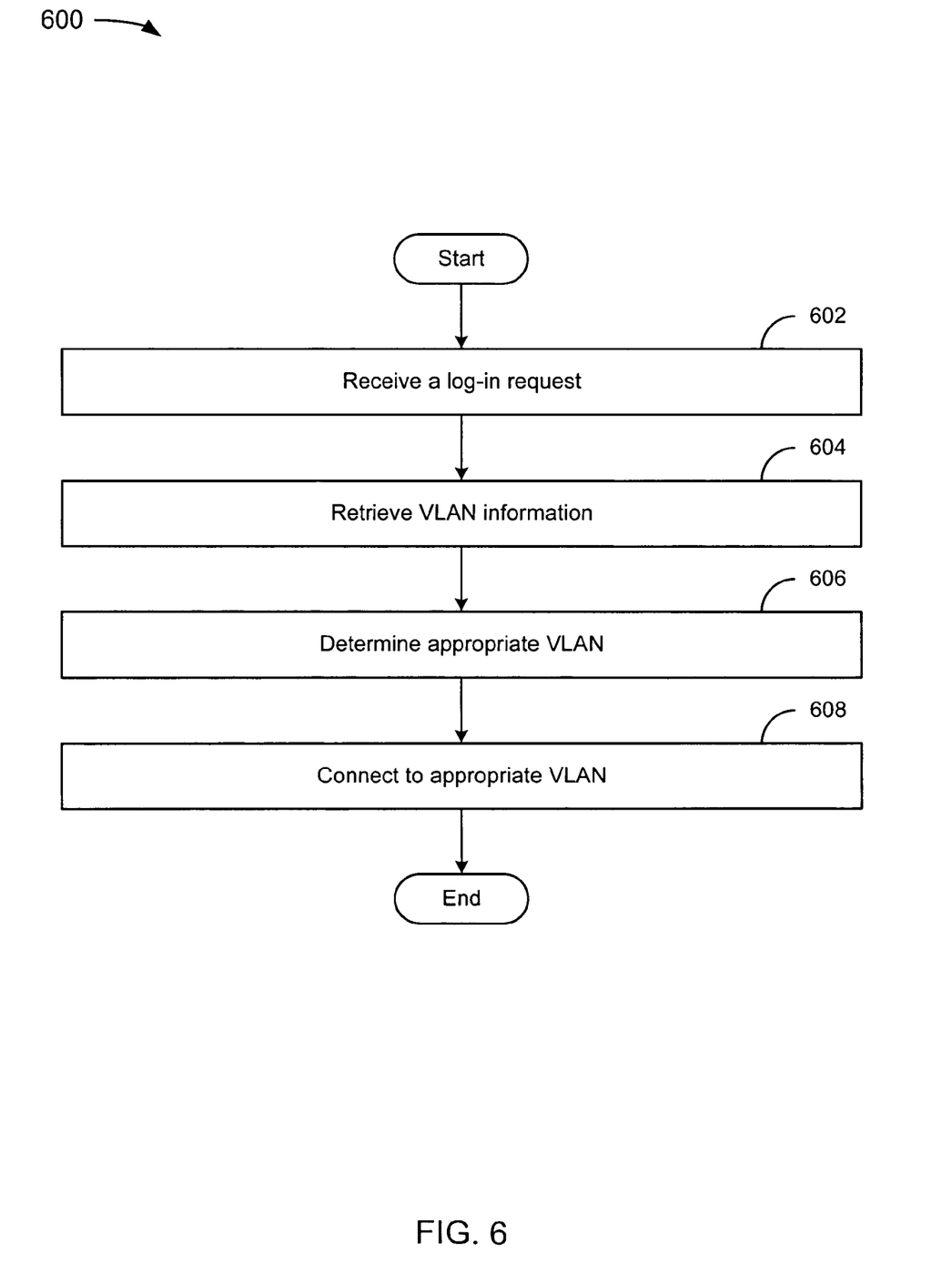
FIG. 6 depicts a flow chart of an example of a method for identity based networking.

FIG. 6 depicts a flowchart 600 of an example of a method for identity based networking. FIG. 6 is intended to illustrate connecting a client to an appropriate VLAN using VLAN tunneling. In the example of FIG. 6, the flowchart 600 starts at module 602 where a log-in request is received. The log-in request can be received by any convenient and/or known device on a network, including, by way of example and not limitation, a switch, access point, router, computer, server, etc. In addition, the log-in request can be made by a client and/or any other convenient and/or known device that can log-in to a network.

In the example of FIG. 6, the flowchart 600 continues at module 604 where VLAN information is retrieved. The VLAN information can be retrieved by any convenient and/or known device using any convenient and/or known technique. By way of example but not limitation, a first switch can query a second switch for VLAN information. The second switch can relay the information to the first switch in response to the query. In another example, a switch can perform a look-up in a network database to retrieve VLAN information. The network database can be located on the switch itself or accessible over the network. In yet another example, a first switch can query a second switch and the second switch can perform a lookup in a network database. The network database can be located on the second switch or accessible by the second switch over a network.

In the example of FIG. 6, the flowchart 600 continues at module 606 where an appropriate VLAN is determined. The appropriate VLAN can be determined by the VLAN information retrieved. In addition, the appropriate VLAN can be determined by a combination of the VLAN information retrieved and the characteristics of the log-in request.

In the example of FIG. 6, the flowchart 600 continues at module 608 where a connection to the appropriate VLAN is established. The connection can be established using any convenient and/or known technique. For example, and not limitation, a VLAN tunnel can be created for a client that is authorized on a VLAN supported by a remote switch.

Figure 7:
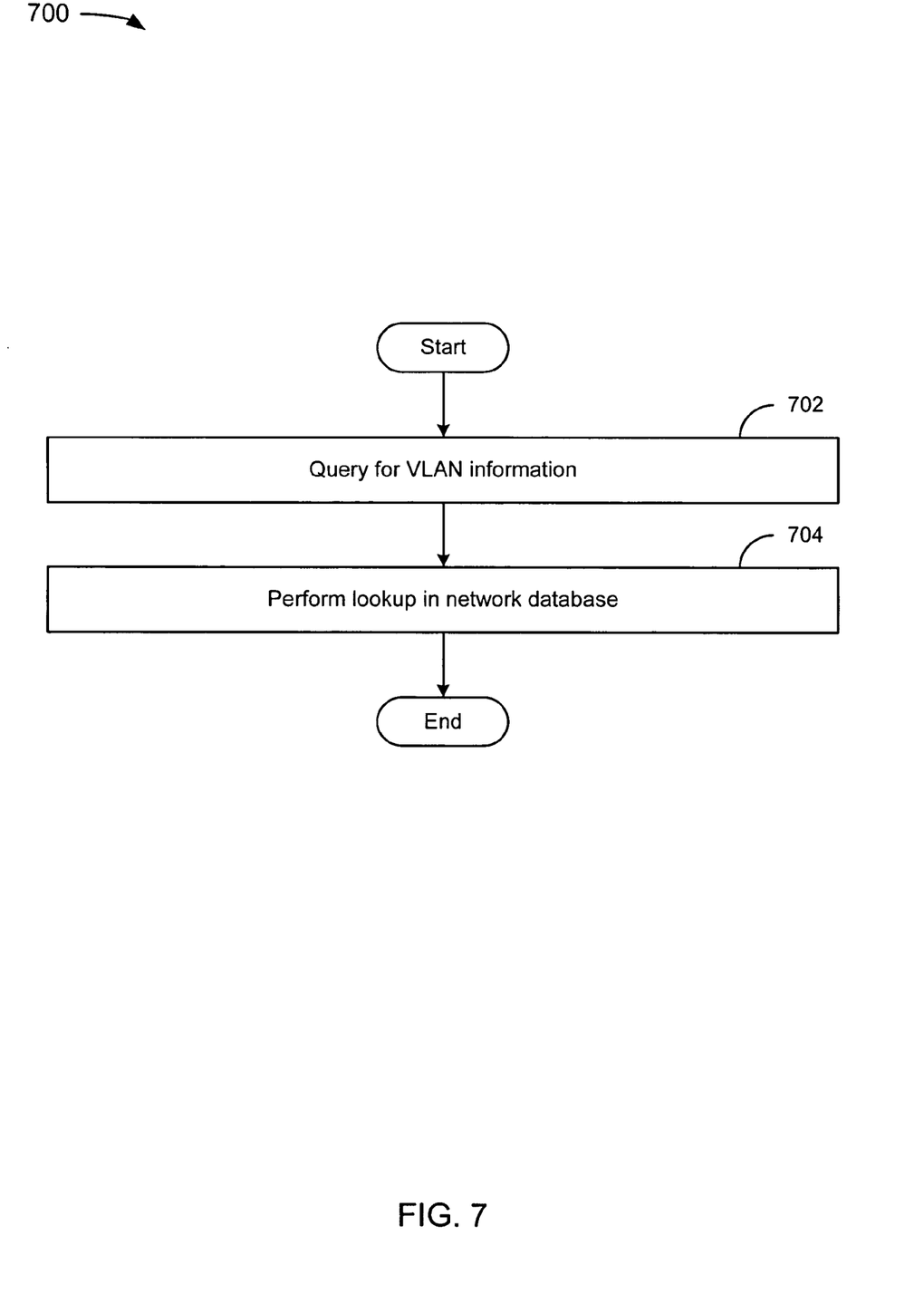
FIG. 7 depicts a flow chart of an alternative example of a method for identity based networking.

FIG. 7 depicts a flowchart 700 of an alternative example of a method for identity based networking. FIG. 7 is intended to illustrate retrieving VLAN information. In the example of FIG. 7, the flowchart 700 starts at module 702 where VLAN information is queried. The query can be facilitated using any known and/or convenient technique capable of retrieving information from a database. For example, and not limitation, a first switch can query a second switch and/or a network database for VLAN information.

In the example of FIG. 7, the flowchart 700 continues at module 704 where a lookup is performed in a network database. The lookup can be performed by any device coupled to the database and/or any device that the database is stored. For example, and not limitation, the second switch can perform a lookup in a network database located locally and relay the retrieved information to the first switch. In another example, the first switch can perform a lookup in a network database that is coupled to the network.

Figure 8:
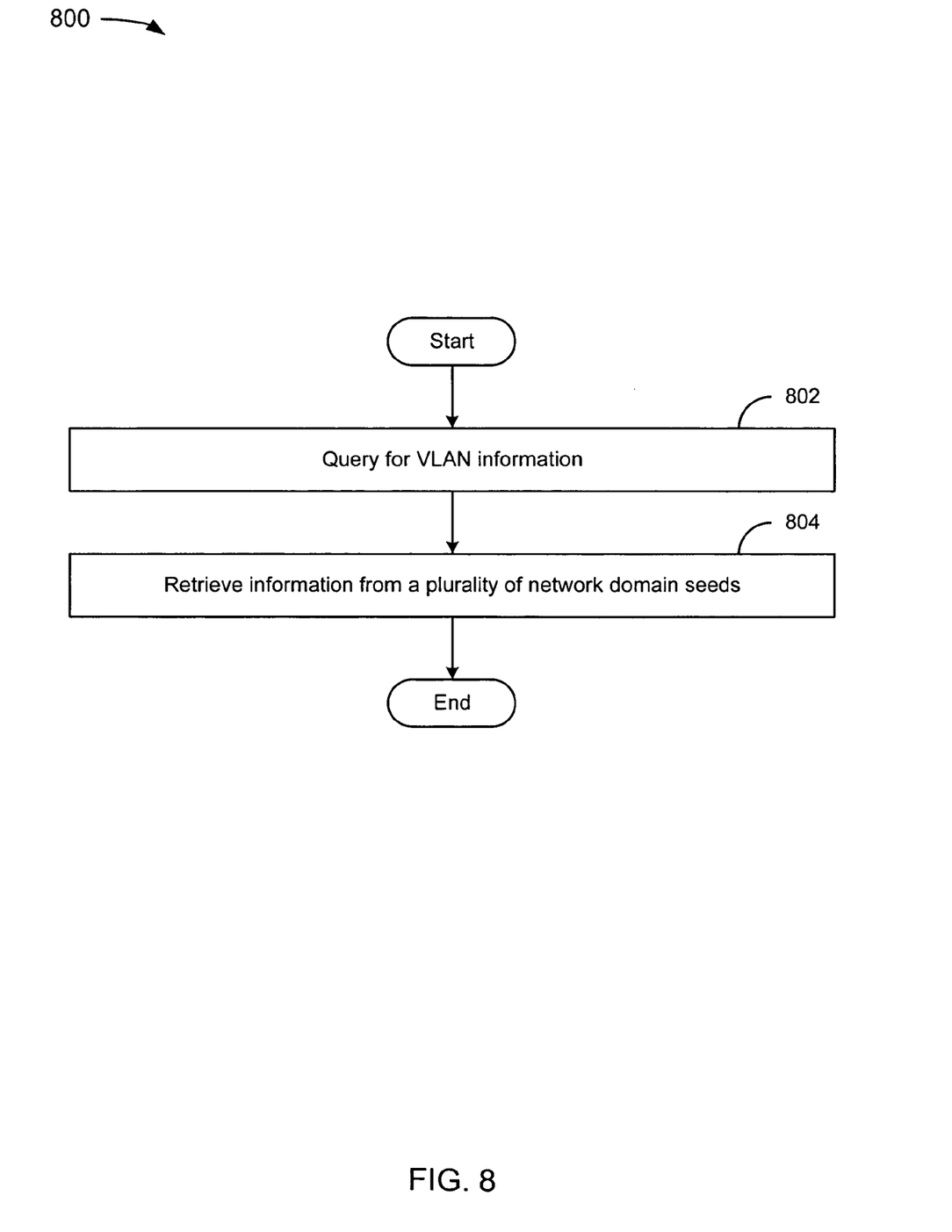
FIG. 8 depicts a flow chart of an alternative example of a method for identity based networking.

FIG. 8 depicts a flowchart 800 of an alternative example of a method for identify based networking. FIG. 8 is intended to illustrate another method of retrieving VLAN information. In the example of 8, the flowchart 800 starts at module 802 where VLAN information is queried. The query can be facilitated using any known and/or convenient technique capable of retrieving information from a database. For example, and not limitation, a network domain member can query a network domain seed for VLAN information.

In the example of FIG. 8, the flowchart 800 continues at module 804 where information is retrieved from a plurality of network domain seeds. The information can be stored on the plurality of network domain seeds and/or can be accessed by the network domain seeds over the network. For example, and not limitation, after receiving a query, a network domain seed can query all other network domain seeds for VLAN information and relay the retrieved information to the network domain member.

Figure 9:
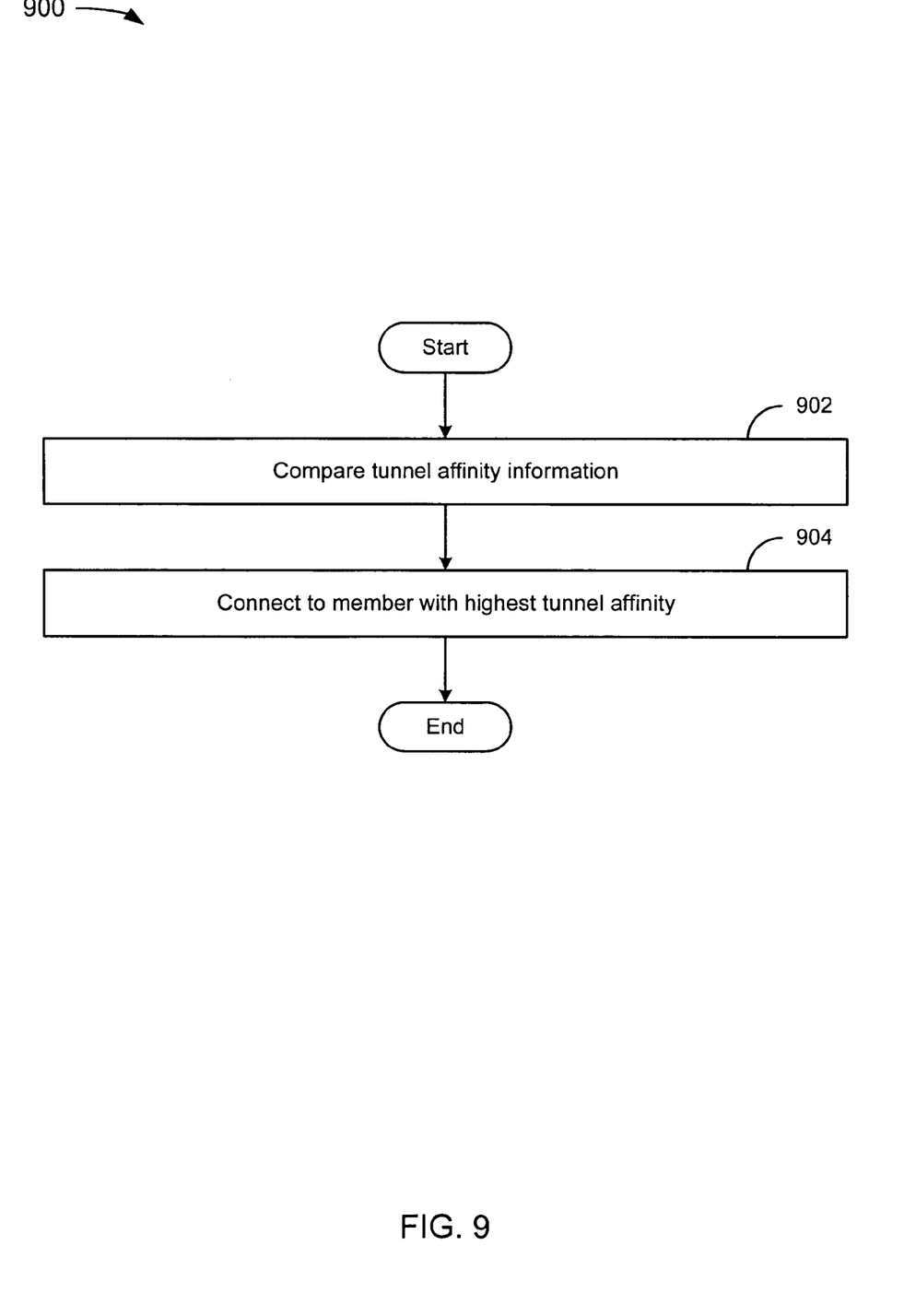
FIG. 9 depicts a flow chart of an alternative example of a method for identify based networking.

FIG. 9 depicts a flowchart 900 of an alternative example of a method for identify based networking. FIG. 9 is intended to illustrate a method of connecting to a switch having the highest tunnel affinity. In the example of FIG. 9, the flowchart 900 starts with module 902 where tunnel affinity information is compared. The tunnel affinity information can be compared for two switches that support the same VLAN. For example, and not limitation, a client that is authorized on a VLAN can connect to any member that supports the VLAN. If two or more members support the VLAN, then the tunnel affinity for each member is compared and a connection is made to the member with the highest tunneling affinity.

In the example of FIG. 9, the flowchart 900 continues with module 904 where a connection is made to the member with the highest tunnel affinity. The connection can be made using any known and/or convenient technique capable of connecting one network member to another. For example, and not limitation, a first network member can create a VLAN tunnel to a second network member in order to connect a client to an authorized VLAN.

Figure 10:
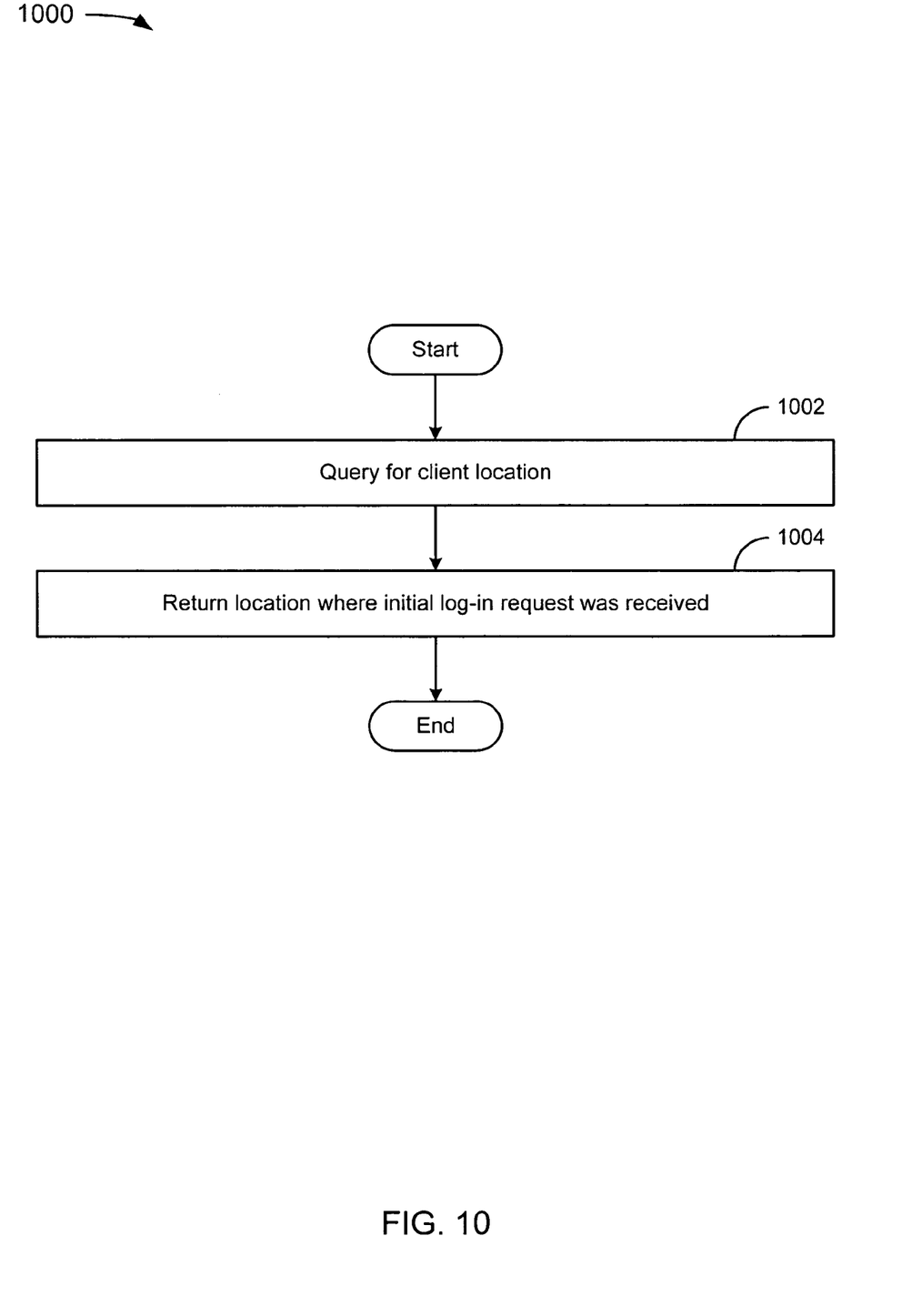
FIG. 10 depicts a flow chart of an example of a method for client location.

FIG. 10 depicts a flowchart 1000 of an example of a method for client location. FIG. 10 is intended to illustrate a method of locating a client that is accessing a network. In the example of FIG. 10, the flowchart 1000 starts with module 1002 where a client's location is queried. The query for a client's location can be made by any convenient and/or known device coupled to the network. For example, and not limitation, the query can be made by via a command line interface, network management software, computer, switch, router and/or any other convenient and/or known device capable of sending commands on a network.

In the example of FIG. 10, the flowchart 1000 continues at module 1004 where the location of the initial log-in request in returned. In one example, the location of the client can be sent from a switch that received the client's initial log-in request. In another example, the location of the client can be sent from a network domain seed that provided VLAN information to a switch that queried for the information. In yet another example, the switches on the ends of a VLAN tunnel can return the location of the initial log-in request.

Using the systems and/or methods depicted in the above examples, the client has the same experience from a remote location as the client would have from being local. For example, a client cam have the same IP address, same network permissions, and same access to network resources even though the client logs-on in a geographically distinct area. These characteristics are extremely beneficial in lower costs and increasing efficiency.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
 a WAN;
 a first VLAN coupled to the WAN;
 a second VLAN coupled to the WAN;
 a network database coupled to the WAN, the network database including VLAN information;
 wherein, in operation, a client that is authorized on the second VLAN attempts to connect to the first VLAN, a switch on the WAN performs a lookup in the network database and determines that the client is authorized on the second VLAN, and, based on the determination, the client is connected to the second VLAN via VLAN tunneling;
 wherein the switch is a network domain member, the system further comprising:
 a network domain seed coupled to the network domain member;
 wherein the network database is stored on the network domain seed and the network domain member queries the network domain seed to perform the lookup in the network database.

2. A system as recited in claim 1, wherein the switch is a first network domain member, the system further comprising:
 a first network domain seed coupled to the first network domain member;
 a second network domain seed coupled to the first network domain seed; and
 a second network domain member coupled to the second network domain seed, the second network domain member supporting the second VLAN;
 wherein the first network domain member tunnels to the second network domain member to connect the client to the second VLAN.

3. A system as recited in claim 1, wherein the switch is a network domain member, the system further comprising:
 a first network domain seed coupled to the network domain member; and
 a second network domain seed coupled to the first network domain seed; wherein the network database is stored on the second network domain seed.

4. A system as recited in claim 1, wherein the switch is a first network domain member, the system further comprising:
 a second network domain member supporting the second VLAN, the second network domain member having a first tunnel affinity; and
 a third network domain member supporting the second VLAN, the third network domain member having a second tunnel affinity;

wherein the first network domain member tunnels to the second network domain member instead of the third network domain member based, at least in part, on the first tunnel affinity.

5. A system as recited in claim 1, wherein the switch is a first network domain member, the system further comprising:
a first network domain seed coupled to the first network domain member;
a second network domain seed coupled to the first network domain seed; and
a second network domain member coupled to the second network domain seed, the second network domain member supporting the second VLAN;
wherein the first network domain seed, the second network domain seed, the first network domain member, and the second network domain member are in geographically distinct locations.

6. A system as recited in claim 1, wherein the network database includes IP addresses for switches on the WAN, VLAN names, and VLAN tunnel affinities.

7. A system as recited in claim 1, further comprising:
a first access point coupled to the switch;
a second access point coupled to the switch; and
a third access point coupled to the switch;
wherein a precise location of the client is determinable by triangulation using data detected by the first access point, the second access point and the third access point.

8. A method comprising:
receiving a log-in request from a client on a first VLAN;
providing VLAN information associated with the client configuration on a second VLAN;
determining, using the VLAN information, that the client is configured on a second VLAN;
connecting the client to the second VLAN via VLAN tunneling;
querying a network domain seed for the VLAN information;
performing a lookup in a network database.

9. A method as recited in claim 8, wherein the log-in request is received by a first network domain member and the first network domain member tunnels to a second network domain member to connect the client to the second VLAN.

10. A method as recited in claim 8, further comprising: querying a network domain seed for the VLAN information; and retrieving information from a plurality of network domain seeds coupled to the WAN.

11. A method as recited in claim 8, wherein the VLAN information includes tunnel affinity information of at least two network domain members, further comprising:
comparing tunnel affinity information, from the VLAN information, of at least two network domain members that support the second VLAN; and
connecting the client to the network domain member with the highest tunnel affinity.

12. A method as recited in claim 8, further comprising:
querying for the client's location; and
returning a location of a switch that received the client's initial log-in request.

13. A system comprising:
means for receiving a log-in request from a client on a first VLAN;
means for determining the client is configured on a second VLAN using information retrieved over a WAN;
means for connecting the client to the second VLAN via VLAN tunneling;
wherein said means for determining includes:
means for querying a network domain seed for VLAN information:
means for performing a lookup in a network database:
means for returning VLAN information.

14. A method as recited in claim 13, wherein the means for querying includes:
means for retrieving information from a plurality of network domain seeds coupled to the WAN.

15. A system as recited in claim 13 wherein said information includes tunnel affinity information, the system further comprising:
means for comparing the tunnel affinity information of two network domain members that support the second VLAN; and
means for connecting the client to the network domain member with a highest tunnel affinity.

16. A system as recited in claim 13, further comprising:
means for querying for a location associated with the client; and
means for returning a location of a switch that received the log-in request from the client.

17. A system as recited in claim 16, further comprising:
means for determining a precise location of the client using triangulation.

* * * * *